(12) United States Patent
Chino (10) Patent No.: US 9,628,694 B2
(45) Date of Patent: Apr. 18, 2017

(54) IMAGE PICKUP APPARATUS THAT DRIVINGLY CONTROLS LENSES AND CONTROL METHOD THEREFOR

(71) Applicant: CANON KABUSHIKI KAISHA, Tokyo (JP)

(72) Inventor: Shunsuke Chino, Wako (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/622,376

(22) Filed: Feb. 13, 2015

(65) Prior Publication Data
US 2015/0237254 A1    Aug. 20, 2015

(30) Foreign Application Priority Data

Feb. 17, 2014    (JP) ................... 2014-027600

(51) Int. Cl.
| | | |
|---|---|---|
| *H04N 5/232* | (2006.01) | |
| *G02B 7/28* | (2006.01) | |
| *G02B 13/00* | (2006.01) | |

(52) U.S. Cl.
CPC ......... *H04N 5/23212* (2013.01); *G02B 7/282* (2013.01); *G02B 13/0015* (2013.01); *H04N 5/23296* (2013.01)

(58) Field of Classification Search
CPC .......... H04N 5/23296; H04N 5/23212; H04N 5/2254; G02B 7/282; G02B 13/0015; G02B 15/14; G03B 5/00
USPC ................................................. 348/345–357
See application file for complete search history.

(56) References Cited

U.S. PATENT DOCUMENTS

| | | | | |
|---|---|---|---|---|
| 2011/0249150 A1* | 10/2011 | Shintani | ............. | H04N 5/23212 348/240.3 |
| 2012/0050577 A1* | 3/2012 | Hongu | ................... | G02B 7/102 348/240.1 |
| 2013/0050568 A1* | 2/2013 | Adachi | .................... | G03B 3/10 348/345 |
| 2013/0128094 A1* | 5/2013 | Mise | ................... | H04N 5/23245 348/335 |
| 2013/0141599 A1* | 6/2013 | Kimura | .................. | H04N 5/225 348/207.99 |
| 2013/0155263 A1* | 6/2013 | Kishida | ................... | G03B 13/34 348/208.5 |
| 2013/0163084 A1* | 6/2013 | Miyazawa | ............. | G02B 27/64 359/554 |
| 2013/0182140 A1* | 7/2013 | Yasuda | .................... | G02B 7/09 348/222.1 |

(Continued)

FOREIGN PATENT DOCUMENTS

JP      2013-080082 A      5/2013

*Primary Examiner* — Pritham Prabhakher
(74) *Attorney, Agent, or Firm* — Cowan Liebowitz & Latman, P.C.

(57) ABSTRACT

An image pickup apparatus that performs focusing and zooming by driving lenses and enables focusing that reduces variations in the angle of view without making any modifications to an optical system. An image pickup optical system has a first lens that changes the shooting angle of view, and a second lens that changes a focus position for a subject. An image of the subject formed by the image pickup optical system is converted into an electric signal. The first lens and the second lens are driven. The amount of wobble for use in controlling the focus position for the subject is set according to drive characteristics of at least one of the first lens and the second lens.

4 Claims, 7 Drawing Sheets

(56) References Cited

U.S. PATENT DOCUMENTS

| | | | |
|---|---|---|---|
| 2013/0201385 A1* | 8/2013 | Shukuin | H04N 5/23212 348/349 |
| 2014/0078326 A1* | 3/2014 | Ozawa | G02B 7/38 348/208.5 |
| 2014/0186017 A1* | 7/2014 | Shibata | H04N 5/23248 396/55 |

* cited by examiner

| | FOCUS HYSTERESIS: 2 [pulse] | ZOOM HYSTERESIS: 2 [pulse] |
|---|---|---|
| | Focus | Zoom |
| Wide | 6 | 3 |
| Middle | 6 | 3 |
| Tele | 6 | 3 |

*FIG. 7B*

| | FOCUS HYSTERESIS: 4 [pulse] | ZOOM HYSTERESIS: 4 [pulse] |
|---|---|---|
| | Focus | Zoom |
| Wide | 8 | 4 |
| Middle | 8 | 4 |
| Tele | 8 | 4 |

*FIG. 7C*

| | FOCUS HYSTERESIS: 2 [pulse] | ZOOM HYSTERESIS: 4 [pulse] |
|---|---|---|
| | Focus | Zoom |
| Wide | 8 | 4 |
| Middle | 8 | 4 |
| Tele | 8 | 4 |

*FIG. 7D*

| | FOCUS HYSTERESIS: 4 [pulse] | ZOOM HYSTERESIS: 2 [pulse] |
|---|---|---|
| | Focus | Zoom |
| Wide | 6 | 3 |
| Middle | 6 | 3 |
| Tele | 6 | 3 |

IMAGE PICKUP APPARATUS THAT DRIVINGLY CONTROLS LENSES AND CONTROL METHOD THEREFOR

BACKGROUND OF THE INVENTION

Field of the Invention

The present invention relates to an image pickup apparatus that drivingly controls lenses constituting an image pickup optical system and a control method therefor, and in particular to an image pickup apparatus that attains proper focus by correcting for variations in the shooting angle of view during a focusing operation and a control method therefor.

Description of the Related Art

Generally, in image pickup optical systems (lens barrels) of image pickup apparatuses such as photographic cameras and digital cameras, focusing is performed by moving a focus lens in a direction of an optical axis, and zooming is performed by moving a zoom lens in the direction of the optical axis. In recent years, due to widening and miniaturization of lenses, even when the distance to a subject does not change, the amount by which a focus lens group is extended so as to adjust focus in response to zooming, or the sensitivity of a focus lens to the angle of view associated with zooming is high. When the angle of view is caused to greatly change by focusing, there arises a problem that there is a wide divergence from an angle of view desired by a person who shoots, and it is impossible to take intended pictures (images).

As a way to solve this problem, there is known a technique that corrects the angle of view by driving a zoom lens in accordance with a focus lens when focusing. Here, in digital cameras, for example, the cell pitch of an image pickup device is becoming smaller due to an increase in the number of pixels of image pickup devices. The decrease in the cell pitch of the image pickup devices will make the allowable depth shallower and decrease the amount by which the focus lens and the zoom lens are driven. For this reason, drive characteristics of each lens affect focusing accuracy. Accordingly, for example, there has been proposed a technique to correct for a backlash of a focus lens based on a drive load on the focus lens when it is reversed (see Japanese Laid-Open Patent Publication (Kokai) No. 2013-80082).

The technique described in Japanese Laid-Open Patent Publication (Kokai) No. 2013-80082, however, has no technical concept that a focus lens and a zoom lens are driven at the same time. Thus, a new technique is required so as to obtain satisfactorily high focusing accuracy while suppressing variations in the angle of view during lens drive control that drives a focus lens and a zoom lens at the same time.

SUMMARY OF THE INVENTION

The present invention provides an image pickup apparatus and a control method therefor that performs focusing and zooming by driving lenses and enables focusing that suppresses variations in the angle of view without making any modifications to an optical system.

Accordingly, a first aspect of the present invention provides an image pickup apparatus comprising an image pickup optical system configured to have a first lens that changes a shooting angle of view, and a second lens that changes a focus position with respect to a subject, an image pickup unit configured to convert a subject image formed by the image pickup optical system into an electric signal, a drive unit configured to drive the first lens and the second lens at the same time, and a control unit configured to set an amount of wobble for use in controlling the focus position for the subject according to drive characteristics of at least one of the first lens and the second lens.

Accordingly, a second aspect of the present invention provides a control method for an image pickup apparatus having an image pickup optical system which has a first lens that changes a shooting angle of view, and a second lens that changes a focus position with respect to a subject, comprising an image pickup step of converting a subject image formed by the image pickup optical system into an electric signal, a drive step of driving the first lens and the second lens at the same time, and a control step of setting an amount of wobble for use in controlling the focus position for the subject according to drive characteristics of at least one of the first lens and the second lens.

According to the present invention, the amount of wobble for use in controlling a focus position with respect to a subject is set based on drive characteristics of at least one of the first lens, which performs zooming, and the second lens, which performs focusing. This enables focusing that suppresses variations in the angle of view without making any modifications to an optical system.

Further features of the present invention will become apparent from the following description of exemplary embodiments (with reference to the attached drawings).

DESCRIPTION OF THE EMBODIMENTS

The present invention will now be described with reference to the drawings showing embodiments thereof.

Figure 1:
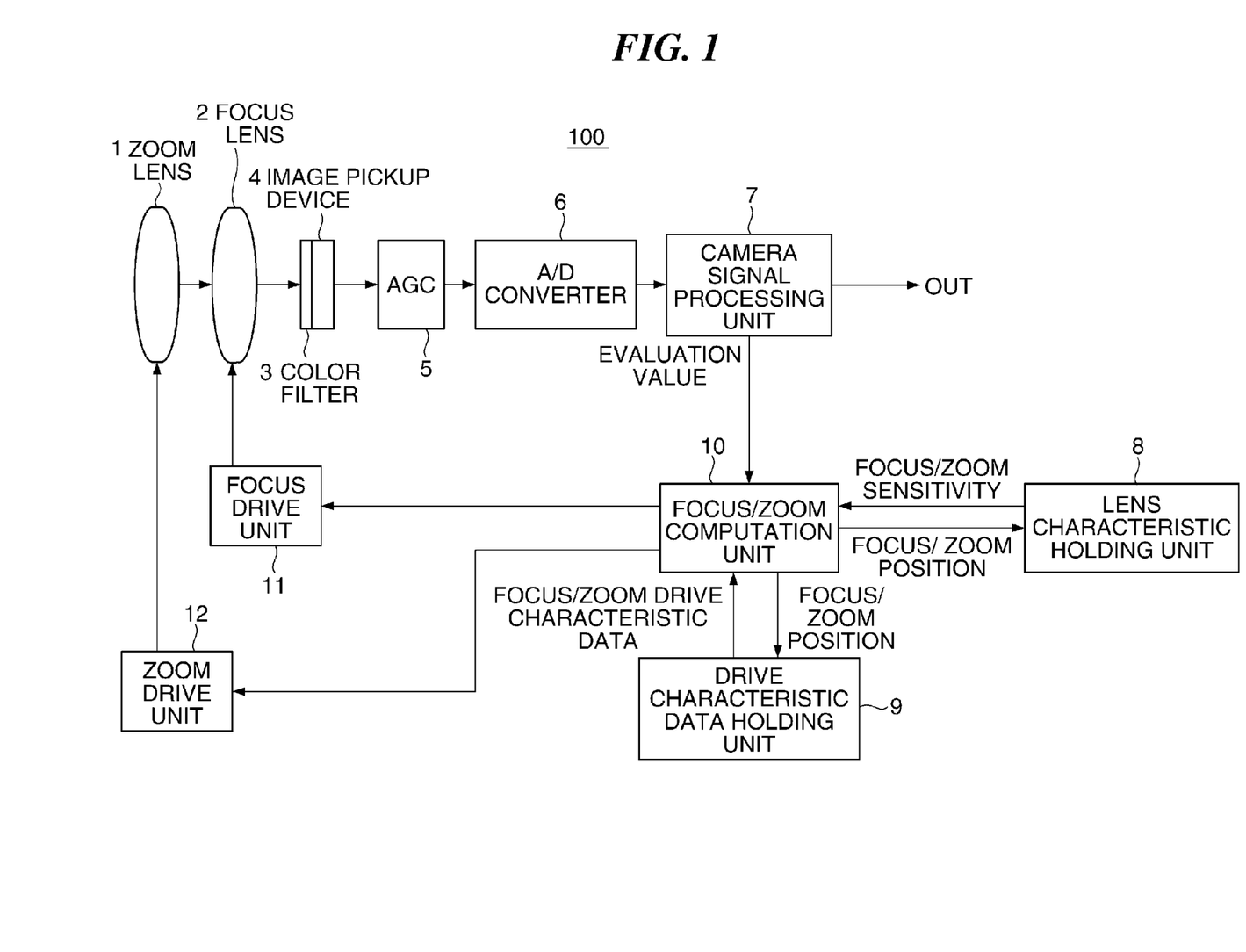
FIG. 1 is a block diagram schematically showing an arrangement of an image pickup apparatus according to a first embodiment of the present invention.

FIG. 1 is a block diagram schematically showing an arrangement of an image pickup apparatus according to a first embodiment of the present invention. Specifically, the image pickup apparatus 100 is a so-called digital camera.

The image pickup apparatus 100 has a zoom lens 1 (first lens), a focus lens 2 (second lens), a color filter 3, an image pickup device 4, an AGC 5, an A/D converter 6, and a camera signal processing unit 7. The image pickup apparatus 100 also has a lens characteristic data holding unit 8, a drive characteristic data holding unit 9, a focus/zoom computation unit 10, a focus drive unit 11, and a zoom drive unit 12.

The zoom lens 1 should not necessarily be a single lens but may be a lens group comprising a plurality of lenses. The same applies to the focus lens 2. The zoom lens 1 and the focus lens 2 constitute an image pickup optical system. The image pickup optical system may include a shutter and a diaphragm, which are not shown. By moving the zoom lens 1 in a direction of an optical axis, the shooting angle of view can be changed. Also, by moving the focus lens 2 in the direction of the optical axis, the focus on a subject can be adjusted to create a state in which the subject is in focus (focusing sate).

A subject image (optical image) formed on the image pickup device 4 through the zoom lens 1, the focus lens 2, and the color filter 3 is converted into an electric signal (analog signal) by the image pickup device 4 and output as an image signal to the AGC 5. The AGC 5 adjusts the gain of the image signal obtained from the image pickup device 4 and sends the image signal of which the gain has been adjusted to the A/D converter 6. The A/D converter 6 converts the image signal obtained from the AGC 5 into a digital signal and sends the digital signal obtained as a result of the conversion to the camera signal processing unit 7. The camera signal processing unit 7 performs image processing on the obtained digital signal to generate image data and outputs the generated image data to an external apparatus. Also, based on the obtained image data, the camera signal processing unit 7 calculates an evaluation value required for auto focusing and outputs the calculated evaluation value to the focus/zoom computation unit 10.

The focus/zoom computation unit 10 controls positions of the focus lens 2 and the zoom lens 1 at the same time via the focus drive unit 11 and the zoom drive unit 12. Accordingly, based on the evaluation value obtained from the camera signal processing unit 7, the focus/zoom computation unit 10 calculates positions of the focus lens 2 and the zoom lens 1 (focus/zoom positions) and sends the calculated focus/zoom positions to the lens characteristic data holding unit 8 and the drive characteristic data holding unit 9.

The lens characteristic data holding unit 8 calculates sensitivity which is lens characteristic data corresponding to the focus/zoom positions obtained from the focus/zoom computation unit 10. Here, the word "sensitivity", which is used for each of the focus lens 2 and the zoom lens 1, represents the rate of change on a focus plane when each of the focus lens 2 and the zoom lens 1 is driven, and expressed by the following equation, "the sensitivity=the amount of change on the focus plane/the amount by which the lens is driven". The lens characteristic data holding unit 8 sends the calculated sensitivities of the focus lens 2 and the zoom lens 1 (focus/zoom sensitivities) to the focus/zoom computation unit 10.

The drive characteristic data holding unit 9 holds drive characteristic data on the focus lens 2 and the zoom lens 1 corresponding to focus/zoom positions. Here, drive characteristics include hysteresis, phase characteristic, temperature characteristic, aging variation characteristic, posture difference characteristic, and so on of a lens, and they are input-output characteristics obtained by calculating the ratio of the amount by which the lens is actually driven to the number of pulses transmitted so as to drive the lens. A detailed description will be given later of drive characteristics.

Upon receiving focus/zoom positional data from the focus/zoom computation unit 10, the drive characteristic data holding unit 9 calculates drive characteristic data according to the received focus/zoom positional data and sends the calculated drive characteristic data to the focus/zoom computation unit 10.

The focus/zoom computation unit 10 manages focus/zoom positions. During a focusing operation, based on focus/zoom positions, sensitivity, and drive characteristic data, the focus/zoom computation unit 10 calculates the amounts by which the zoom lens 1 and the focus lens 2 are driven and issues control instructions to the focus drive unit 11 and the zoom drive unit 12. Based on the control instructions (control signals) from the focus/zoom computation unit 10, the focus drive unit 11 and the zoom drive unit 12 drives the focus lens 2 and the zoom lens 1, respectively.

It should be noted that a shooting operation in the image pickup apparatus 100 is implemented by a central control unit (CPU), not shown, expanding programs stored in a ROM, not shown, into a RAM, not shown, and executing the same to control motions and processes of components constituting the image pickup apparatus 100.

Figure 2:
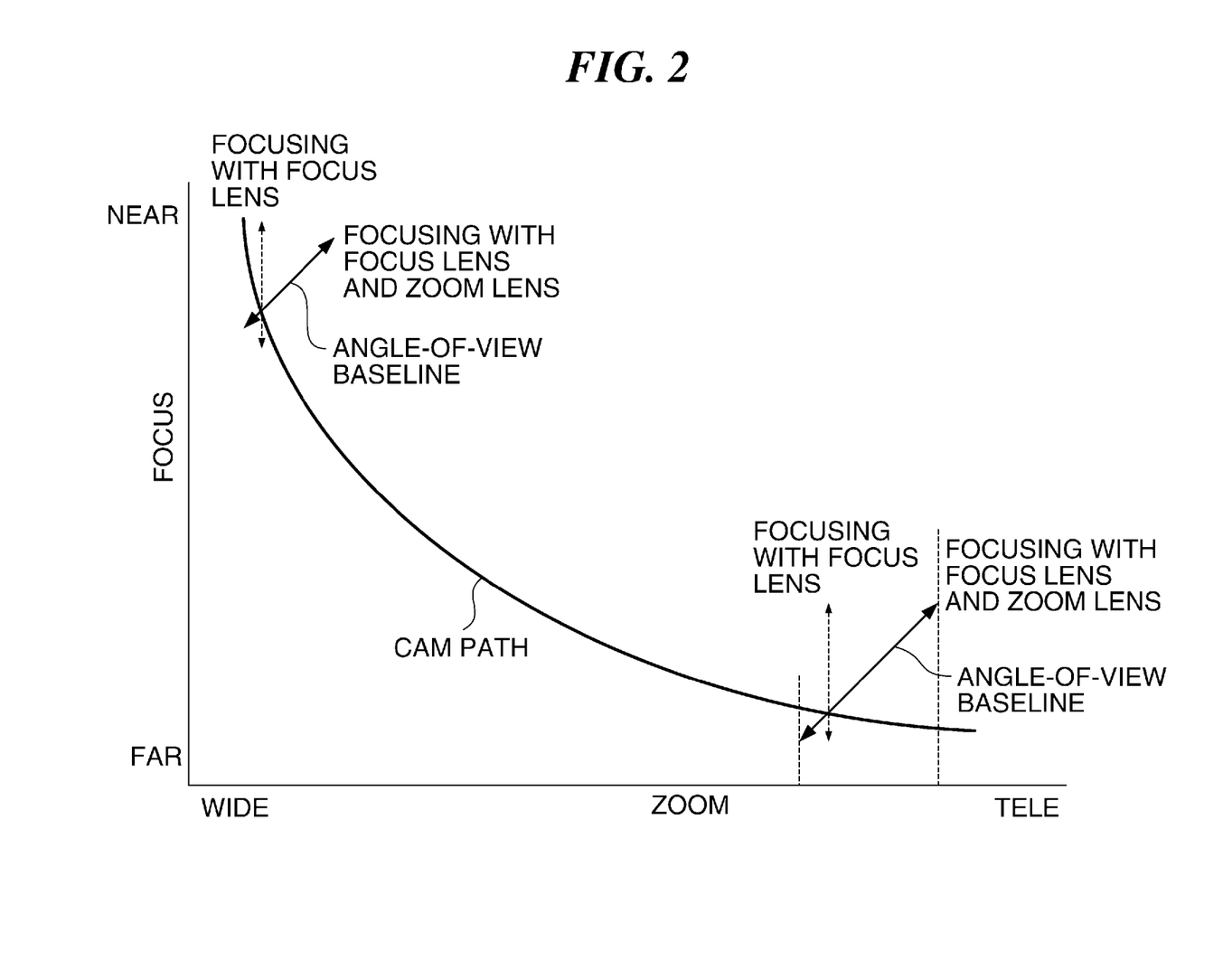
FIG. 2 is a diagram useful in explaining a focusing operation in the image pickup apparatus according to the first embodiment.

FIG. 2 is a diagram useful in explaining a focusing operation in the image pickup apparatus 100. In FIG. 2, vertical broken lines with the words "focusing operation with focus lens" indicates motions of the focus lenses 2 and the zoom lenses 1 in a case where a focusing operation is performed using only the focus lens 2 as is usual. According to this method, only the focus lens 2 is driven with the zoom lens 1 being fixed. This method, however, requires the focus lens 2 to be extended by a large amount, and when the image pickup optical system is configured such that the sensitivity of the focus lens 2 to the angle of view is high, changes in the angle of view caused by focusing are not allowable. For this reason, in the present embodiment, an approximate curve where the angle of view is optically uniform (hereafter referred to as "the angle-of-view baseline") is calculated, and the angle-of-view baseline is traced to perform focusing while suppressing variations in the angle of view. Namely, in the present embodiment, as indicated by the angle-of-view baseline, the zoom lens 1 and the focus lens 2 are driven at the same time. It should be noted that the angle-of-view baseline should not necessarily be approximated according to a linear expression but may be approximated using an index function or an expression of degree n (an expression of the second order, an expression of the third order, etc.).

Figure 3:
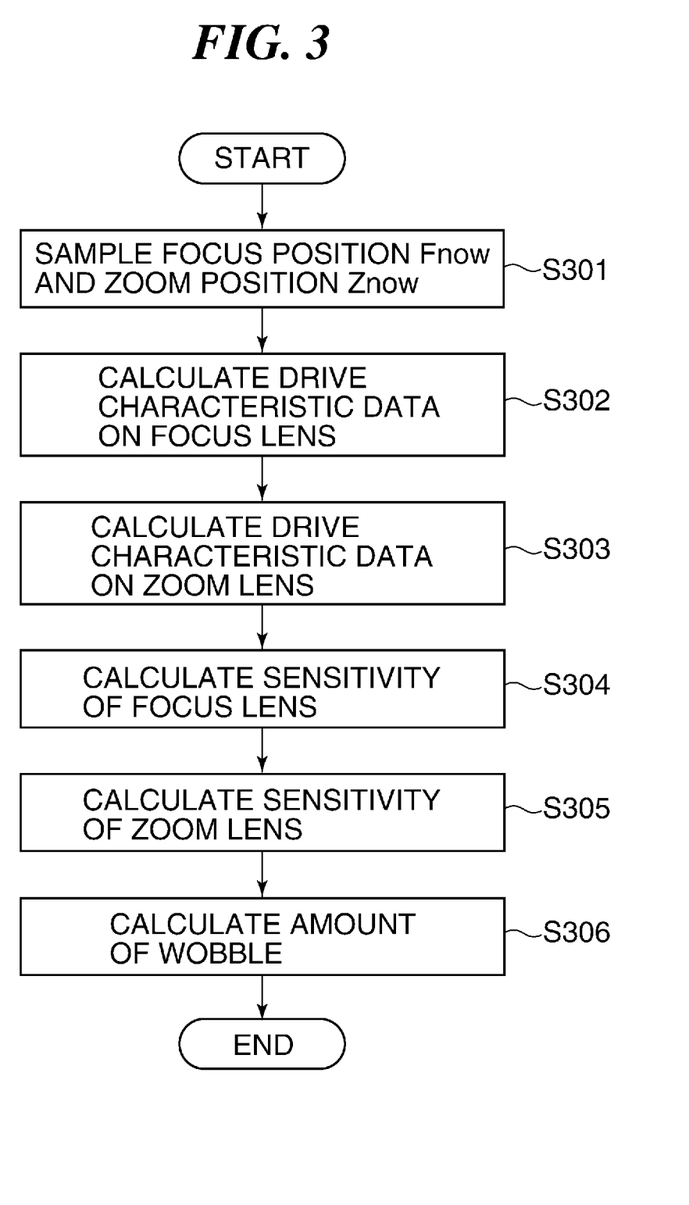
FIG. 3 is a flowchart showing the flow of the focusing operation in the image pickup apparatus according to the first embodiment.

FIG. 3 is a flowchart showing the flow of a focusing operation in the image pickup apparatus 100. Processes in FIG. 3 are implemented by controlling motions and processes of components constituting the image pickup apparatus 100 under the control of the central control unit (CPU).

First, in step S301, the focus/zoom computation unit 10 calculates present focusing position Fnow and zoom position Znow. Next, in step S302, the drive characteristic data holding unit 9 calculates drive characteristic data on the focus lens 2 based on the focus position Fnow obtained in the step S301. Also, in step S303, the drive characteristic data holding unit 9 calculates drive characteristic data on the zoom lens 1 based on the zoom position Znow obtained in the step S301. It should be noted that the order in which the processes in the steps S302 and S303 are performed may be reversed.

Then, in step S304, the lens characteristic data holding unit 8 calculates the sensitivity of the focus lens 2 based on the focus position Fnow obtained in the step S301. Also, in step S305, the lens characteristic data holding unit 8 calculates the sensitivity of the zoom lens 1 based on the zoom position Znow obtained in the step S301. It should be noted that the order in which the processes in the steps S304 and S305 are performed may be reversed.

After that, in step S306, the focus/zoom computation unit 10 calculates the amount of wobble k. The amount of wobble k, which is the amount by which a focus position is wavered by a minutely small amount so as to perform a focusing operation, is calculated using the following expression, "k=amount of focus wobble× focus drive characteristic× focus sensitivity+amount of zoom wobble×zoom drive characteristic×focus sensitivity".

If the amount of wobble k is too large, the angle of view will change by a large amount during a focusing operation, and a change in focus is apparent in an image. On the other hand, if the amount of wobble k is too small, a focusing operation will stop in a state of poor focus (blurring) due to noise effects, and a focus peak will not be found. For this reason, the amount of wobble k should be set at such an appropriate value that a focus peak can be found during a focusing operation. As a guide, the amount of wobble k should be 1/4 to 1/1 of the depth of focus. It should be noted that depending on a zoom position, the focus lens 2 and the zoom lens 1 may differ in sensitivity. At a zoom position where the sensitivity of the zoom lens 1 is sufficiently lower than that of the focus lens 2, a focusing operation is allowed to be performed using only the focus lens 2.

In many cases, the ranges in which the focus lens 2 and the zoom lens 1 are driven (hereafter referred to as "the drivable ranges") are electrically set at ranges in which a focusing operation is possible. If the drivable ranges are not wide enough, a subject at a distance that needs focusing will be out of focus, and when the drivable ranges are too wide, the focus lens 2 will be moved more than necessary, making a focusing operation unstable. A stable focusing operation is achieved by changing the drivable ranges of the respective lenses with consideration given to drive characteristics of the focus lens 2 and the zoom lens 1 and the range where the focus needs to be adjusted.

As described earlier, drive characteristic data on the zoom lens 1 and the focus lens 2 includes hysteresis, phase characteristic, temperature characteristic, aging variation characteristic, and posture difference characteristic, and so on. A description will now be given of such characteristics.

Hysteresis arises from so-called mechanical backlash and occurs when the zoom lens 1 and the focus lens 2 are reversed. The phase characteristic is a characteristic indicating that output pulse relative to input pulse varies according to the phase in which a drive motor that drives a lens is running. The temperature characteristic is a characteristic indicating that the amount of drive varies with variations in frictional force or the like of mechanical elements due to environmental temperature changes.

Figure 4:
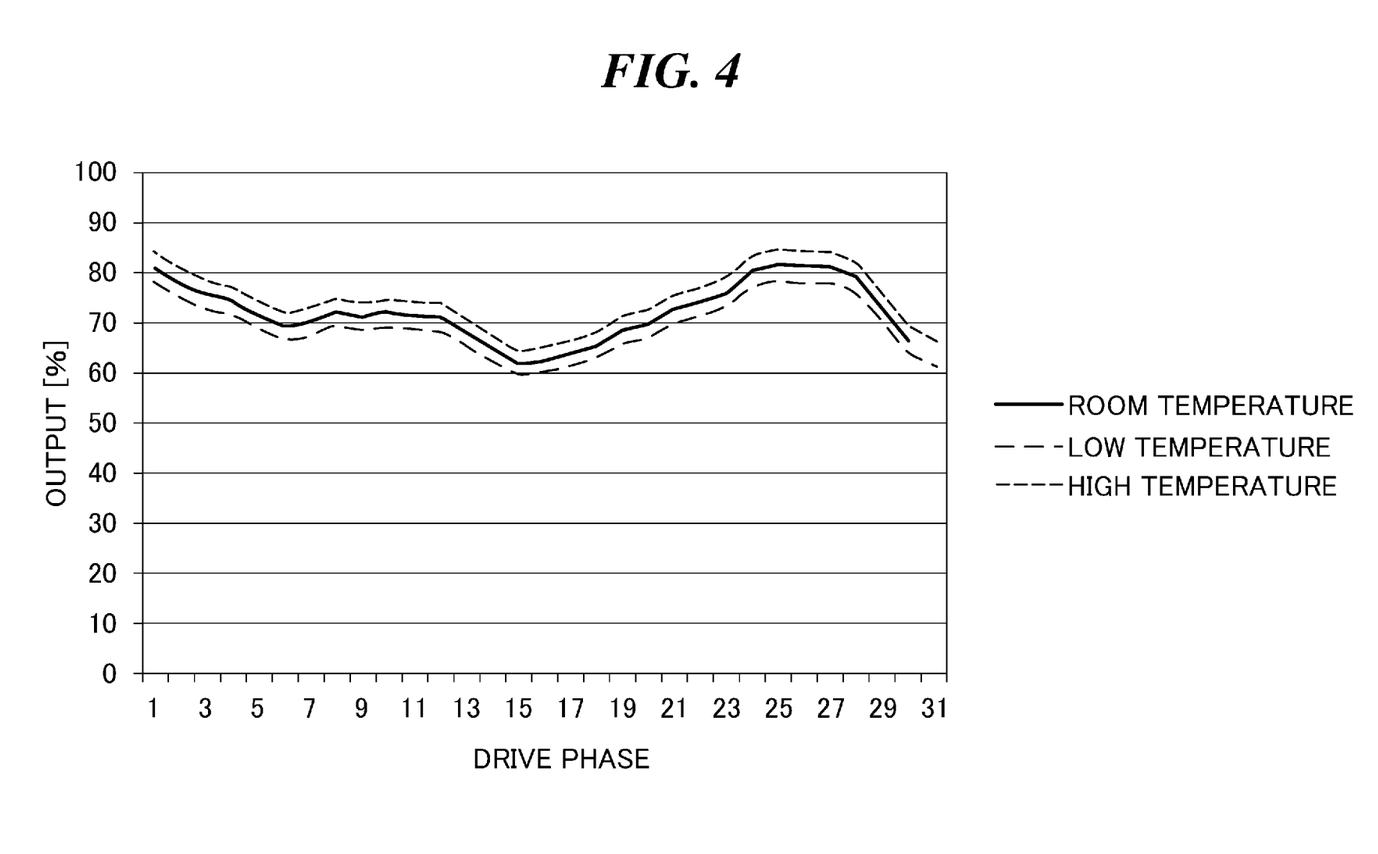
FIG. 4 is a diagram showing drive characteristics with consideration given to phase characteristics and temperature characteristics when a lens is driven in the image pickup apparatus according to the first embodiment.

FIG. 4 shows drive characteristics with consideration given to the phase characteristic and the temperature characteristic when a lens is driven. A lens having the drive characteristics in FIG. 4 constitutes the image pickup optical system and is a common lens movable in the direction of the optical axis. Referring to FIG. 4, the horizontal axis indicates drive phase, and the vertical axis indicates the ratio of output pulse to input pulse. Along the horizontal axis, one sine wave of the drive motor is divided into 32. It is apparent from FIG. 4 that the characteristic of output pulse varies with temperatures (high temperature, room temperature, and low temperature).

The aging variation characteristic is a characteristic arising from aging variations in frictional force or the like based on a mechanical arrangement. The posture difference characteristic is a characteristic indicating that the amount of drive varies as the load applied to parts of the lens varies with lens postures. The effects of these characteristics on a focusing operation vary with lens types, and hence required drive characteristics should be taken into account according to lens types. Setting the amount of wobble according to at least one of the drive characteristics enables the image pickup optical system, which controls the focus lens 2 and the zoom lens 1, to properly perform a focusing operation.

As described above, according to the first embodiment, setting the amount of wobble with consideration given to drive characteristics of the focus lens 2 and the zoom lens 1 enables the image pickup optical system, which controls the focus lens 2 and the zoom lens 1, to properly perform a focusing operation.

Figure 5:
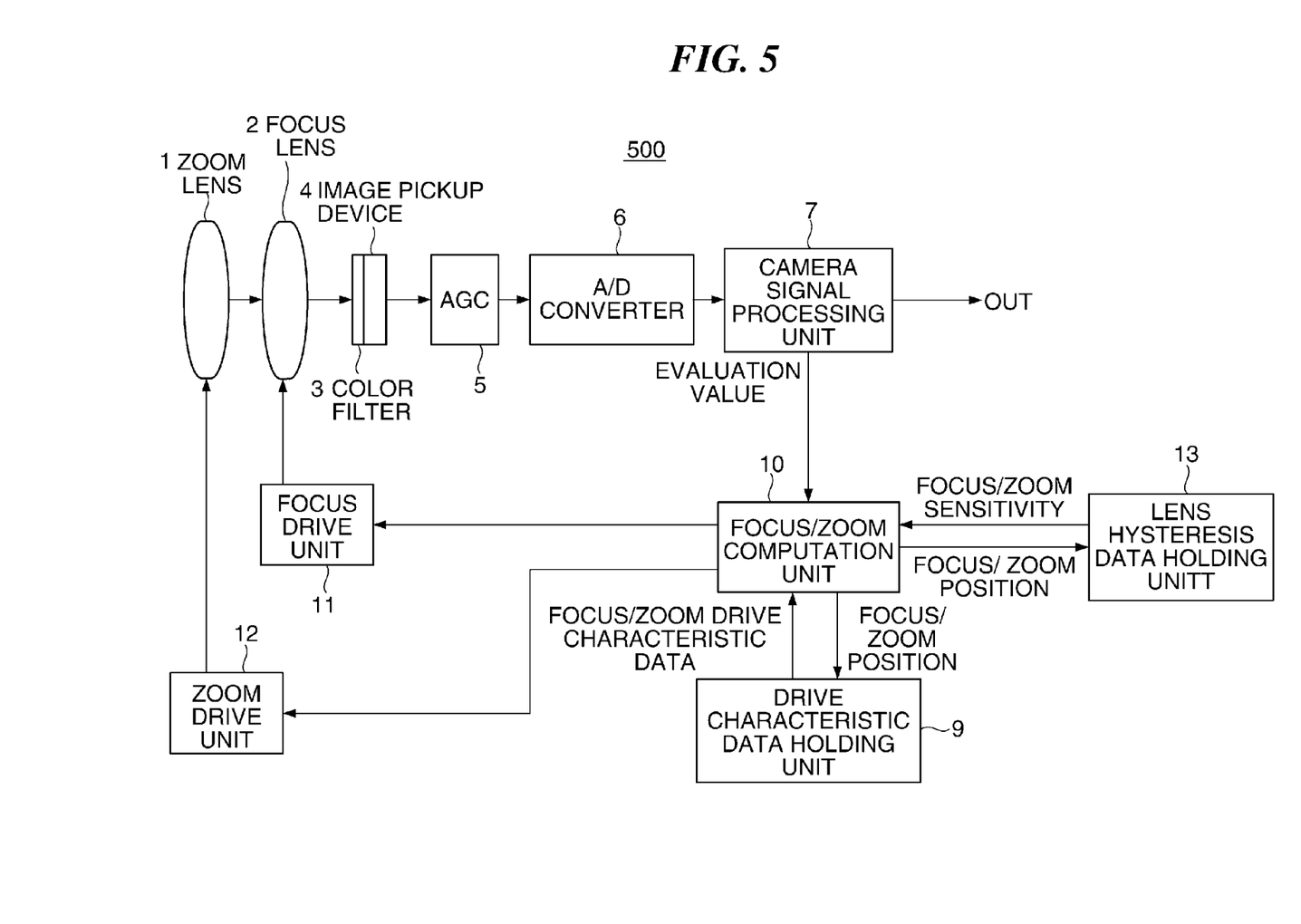
FIG. 5 is a block diagram schematically showing an arrangement of an image pickup apparatus according to a second embodiment of the present invention.

FIG. 5 is a block diagram schematically showing an arrangement of an image pickup apparatus 500 according to a second embodiment of the present invention. The image pickup apparatus 500 is configured to have a lens hysteresis data holding unit 13 in place of the lens characteristic data holding unit 8 which the image pickup apparatus 100 according to the first embodiment described above with reference to FIG. 1 has, and therefore, in FIG. 5, the same component elements as those of the image pickup apparatus 100 are designated by the same reference numerals, and description thereof is omitted here.

The second embodiment focuses on the hysteresis of the focus lens 2 and the zoom lens 1. Namely, in an image pickup optical system having the focus lens 2 and the zoom lens 1 of which hysteresis is large, the focus lens 2 and the zoom lens 1 need to be controlled with consideration given to the hysteresis of each of the focus lens 2 and the zoom lens 1. For each of the focus lens 2 and the zoom lens 1, the lens hysteresis data holding unit 13 holds data (hysteresis data) depending on individual variability among lenses. When there is great variability among lenses, the hysteresis data may be adjusted on a lens-by-lens basis, and the other hand, when there is only small variability among lenses, the hysteresis data may be fixed values.

Figure 6:
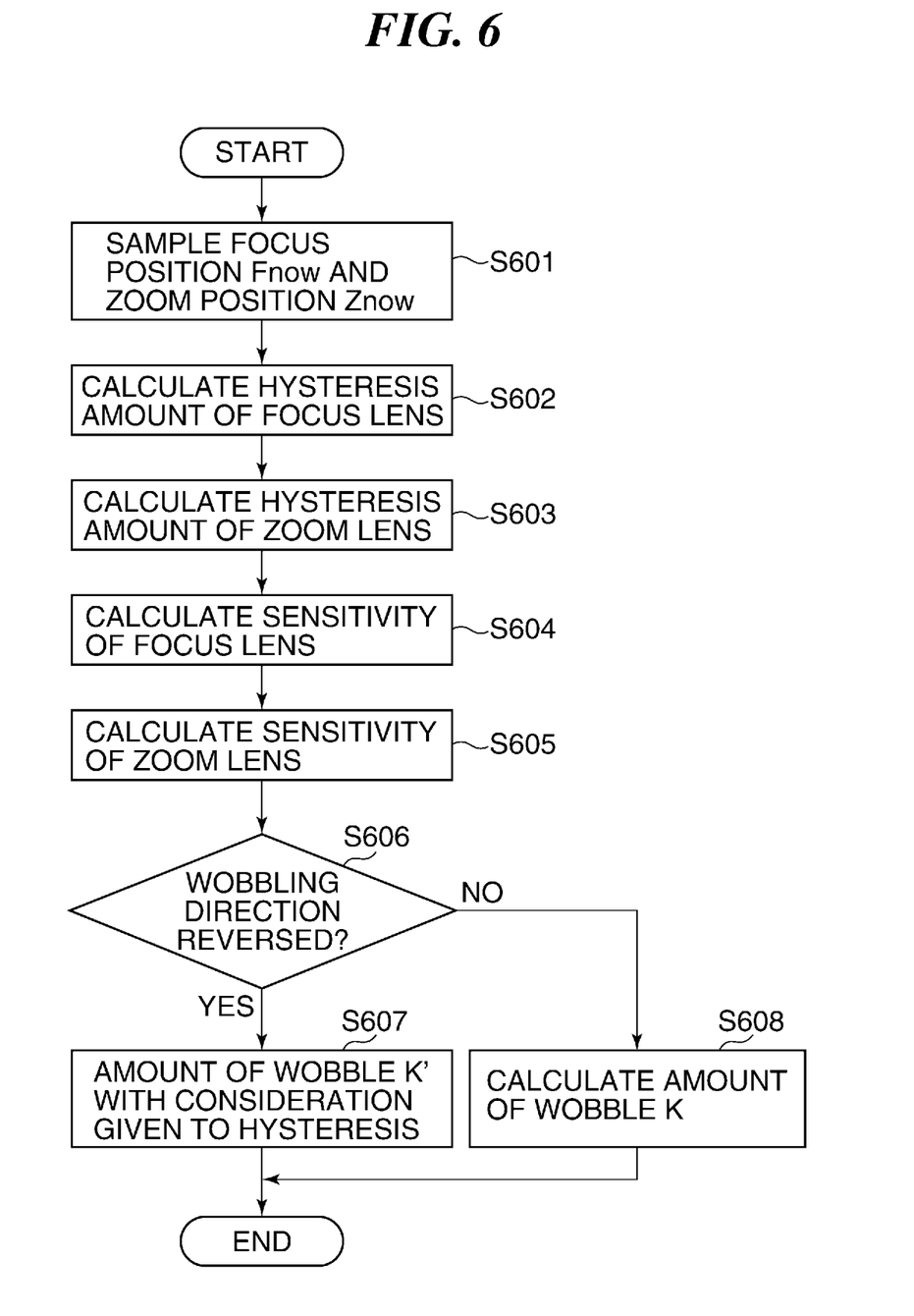
FIG. 6 is a flowchart showing the flow of a focusing operation in the image pickup apparatus according to the second embodiment.
Figure 7A:
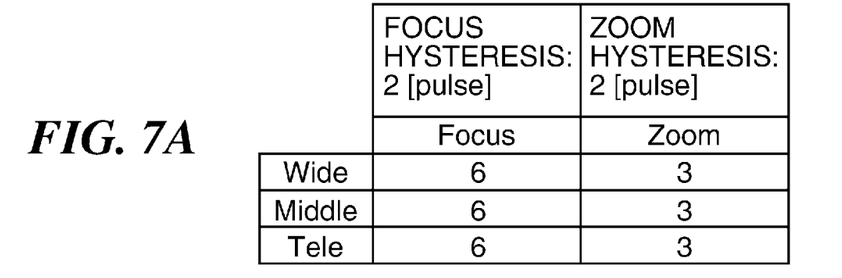
FIGS. 7A to 7D are views showing exemplary tables in which the amount of wobble to be controlled according to hysteresis when a focus lens and a zoom lens are desired to be controlled at a fixed ratio in the image pickup apparatus according to the second embodiment.
Figure 7B:
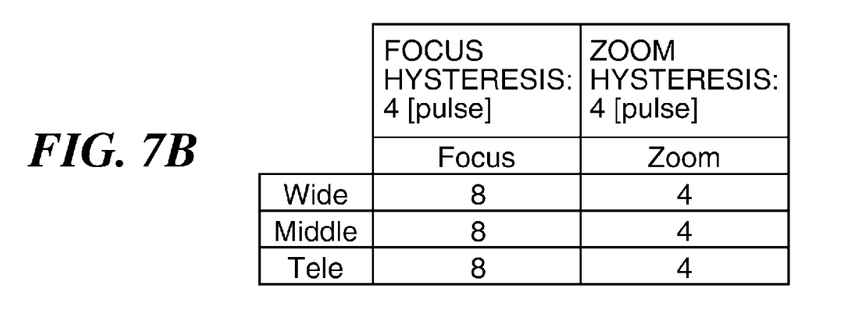
Figure 7C:
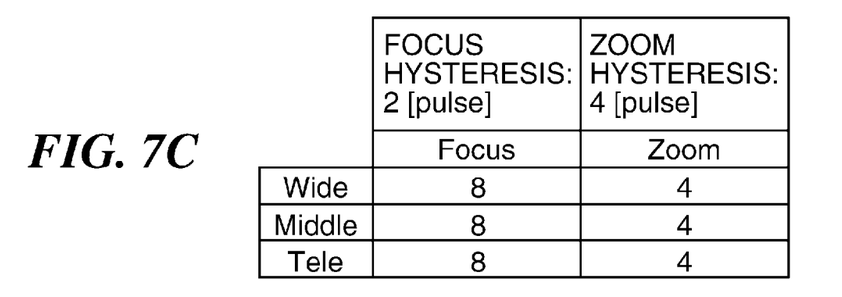
Figure 7D:
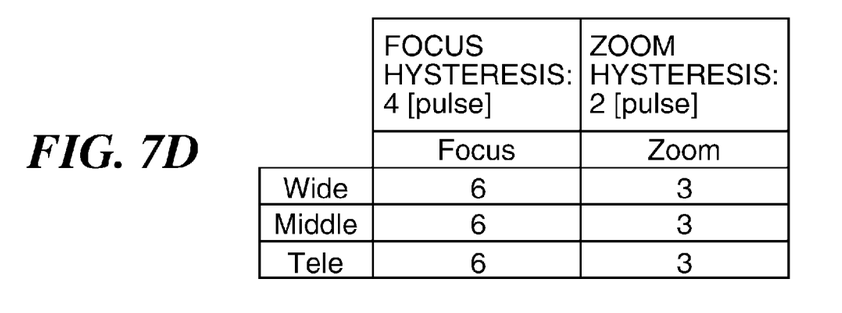

FIG. 6 is a flowchart showing the flow of a focusing operation in the image pickup apparatus 500. Processes in FIG. 6 are implemented by controlling motions of and processes in component parts constituting the image pickup apparatus 500 under the control of a central control unit (CPU).

In step S601, the focus/zoom computation unit 10 calculates present focus position Fnow and zoom position Znow. Then, in step S602, the lens hysteresis data holding unit 13 calculates the hysteresis amount of the focus lens 2. Also, in step S603, the lens hysteresis data holding unit 13 calculates the hysteresis amount of the zoom lens 1. It should be noted that the order in which the processes in the steps S602 and S603 are performed may be reversed.

Then, in step S604, the lens hysteresis data holding unit 13 calculates the sensitivity of the focus lens 2 based on the focus position Fnow obtained in the step S601. Also, in step S605, the lens hysteresis data holding unit 13 calculates the sensitivity of the zoom lens 1 based on the zoom position Znow obtained in the step S601. It should be noted that the order in which the processes in the steps S604 and S605 are performed may be reversed.

After that, in step S606, the focus/zoom computation unit 10 determines whether or not the wobbling direction during a focusing operation has been reversed. When the focus/zoom computation unit 10 determines that the wobbling direction has been reversed (YES in S606), the process proceeds to step S607, and when the focus/zoom computation unit 10 determines that the wobbling direction has not been reversed (NO in S606), the process proceeds to step S608.

In the step S607, the hysteresis of a lens needs to be taken into account. Accordingly, the focus/zoom computation unit 10 calculates the amount of wobble k' with consideration given to hysteresis using the following equation, "k'=(amount of focus wobble−focus hysteresis amount)×focus sensitivity+(amount of zoom wobble−zoom hysteresis amount)×focus sensitivity". On the other hand, in the step S608, there is no effect of hysteresis, and hence the focus/zoom computation unit 10 calculates the amount of wobble k using the following equation, "k=amount of focus wobble×focus sensitivity+amount of zoom wobble×focus sensitivity".

On the other hand, when the focus lens 2 and the zoom lens 1 are desired to be controlled at a fixed ratio, the amount of wobble may be set according to the amount of hysteresis by referring to, for example, tables shown in FIGS. 7A to 7D. FIGS. 7A to 7D are views showing exemplary tables for use in setting the amount of wobble to be controlled according to hysteresis when the focus lens 2 and the zoom lens 1 are desired to be controlled at a fixed ratio.

In each of FIGS. 7A to 7D, "Focus Hysteresis 2 [pulse]" indicates a case where the hysteresis of the focus lens 2 is low", and "Focus Hysteresis 4 [pulse]" indicates a case where the hysteresis of the focus lens 2 is high". Likewise, "Zoom Hysteresis 2 [pulse]" indicates a case where the hysteresis of the zoom lens 1 is low", and "Zoom Hysteresis 4 [pulse]" indicates a case where the hysteresis of the zoom lens 1 is high. When hysteresis is large, a large amount of wobble is set, and when hysteresis is low, a small amount of wobble is set, and a value in one of the tables in FIGS. 7A to 7D is selected according to a combination of the focus lens 2 and the zoom lens 1.

As described above, according to the second embodiment, the amount of wobble is set with consideration given to hysteresis according to the direction in which the focus lens 2 and the zoom lens 1 are driven (wobbling direction). As a result, even in the image pickup optical system having the focus lens 2 and the zoom lens 1 of which hysteresis is large, a focusing operation can be properly performed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-027600, filed Feb. 17, 2014, which is hereby incorporated by reference herein in its entirety.

What is claimed is:

1. An image pickup apparatus comprising:
   at least one processor or circuit configured to perform the operations of the following units:
   an image pickup unit configured to convert a subject image formed by an image pickup optical system into an electrical signal, the image pickup optical system having a zoom lens and a focus lens;
   a drive unit configured to drive the zoom lens so as to suppress variations in an angle of view due to driving of the focus lens; and
   a setting unit configured to set an amount of wobble of the focus lens based on a focus amount of the focus lens, a drive amount of the focus lens, drive characteristics of the focus lens, sensitivity of the focus lens, a drive amount of the zoom lens, drive characteristics of the zoom lens, and sensitivity of the zoom lens,
   wherein the sensitivity of the focus lens is expressed by a change amount of a focus plane of the pickup unit/the drive amount of the focus lens,
   the sensitivity of the zoom lens is expressed by a change amount of a focus plane of the pickup unit/the drive amount of the zoom lens, and
   the drive characteristics comprise at least one of hysteresis, phase characteristic, temperature characteristics, aging variation characteristic, and posture difference characteristic;
   wherein the setting unit performs setting such that a focus operation is performed using the focus lens without using the zoom lens, in a case where the sensitivity of the focus lens is lower than that of the zoom lens.

2. The image pickup apparatus according to claim 1, wherein the setting unit changes a range in which the zoom lens or the focus lens is driven according to the drive characteristics of the zoom lens or the focus lens.

3. The image pickup apparatus according to claim 1, wherein the setting unit calculates an amount of wobble using the following equation:
   The amount of wobble=(amount of focus wobble×focus drive characteristic x focus sensitivity)+(amount of zoom wobble×zoom drive characteristic×zoom sensitivity).

4. A control method for an image pickup apparatus, comprising:
   an image pickup step of converting a subject image formed by an image pickup optical system into an electrical signal, the image pickup optical system having a zoom lens and a focus lens;
   a drive step of driving the zoom lens so as to suppress variations in an angle of view due to driving of the focus lens; and
   a setting step of setting an amount of wobble of the focus lens based on a focus amount of the focus lens, a drive amount of the focus lens, drive characteristics of the focus lens, sensitivity of the focus lens, a drive amount of the zoom lens, drive characteristics of the zoom lens, and sensitivity of the zoom lens, wherein the sensitivity of the focus lens is expressed by a change amount of a focus plane of the pickup unit/the drive amount of the focus lens, the sensitivity of the zoom lens is expressed by a change amount of a focus plane of the pickup unit/the drive amount of the zoom lens, and the drive characteristics comprise at least one of hysteresis, phase characteristic, temperature characteristics, aging variation characteristic, and posture difference characteristic;

wherein the setting step performs setting such that a focus operation is performed using the focus lens without using the zoom lens, in a case where the sensitivity of the focus lens is lower than that of the zoom lens.

* * * * *